United States Patent
Sankarasubramaniam et al.

(10) Patent No.: US 8,730,157 B2
(45) Date of Patent: May 20, 2014

(54) HAND POSE RECOGNITION

(75) Inventors: Yogesh Sankarasubramaniam, Karnataka (IN); Krusheel Munnangi, Karnataka (IN); Anbumani Subramanian, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 585 days.

(21) Appl. No.: 12/986,196

(22) Filed: Jan. 7, 2011

(65) Prior Publication Data
US 2012/0119984 A1 May 17, 2012

(30) Foreign Application Priority Data
Nov. 15, 2010 (IN) .......................... 3420/CHE/2010

(51) Int. Cl.
G09G 5/00 (2006.01)
(52) U.S. Cl.
USPC .......................................... 345/156; 345/175
(58) Field of Classification Search
None
See application file for complete search history.

(56) References Cited

U.S. PATENT DOCUMENTS

| | | | | |
|---|---|---|---|---|
| 4,760,397 A * | 7/1988 | Piccolruaz | ........................ | 342/75 |
| 5,581,276 A * | 12/1996 | Cipolla et al. | ................ | 345/156 |
| 6,215,890 B1 | 4/2001 | Matsuo et al. | ................ | 382/103 |
| 6,788,809 B1 * | 9/2004 | Grzeszczuk et al. | .......... | 382/154 |
| 6,819,782 B1 * | 11/2004 | Imagawa et al. | .............. | 382/115 |
| 7,289,645 B2 * | 10/2007 | Yamamoto et al. | ........... | 382/104 |
| 7,565,295 B1 * | 7/2009 | Hernandez-Rebollar | ..... | 704/271 |
| 2002/0013675 A1 * | 1/2002 | Knoll et al. | .................... | 702/150 |
| 2006/0098845 A1 * | 5/2006 | Sotiropoulos et al. | ....... | 382/107 |
| 2006/0251298 A1 * | 11/2006 | Bronstein et al. | ............. | 382/118 |
| 2007/0091292 A1 * | 4/2007 | Cho et al. | ........................ | 355/75 |
| 2008/0152218 A1 * | 6/2008 | Okada | ............................ | 382/159 |
| 2008/0219502 A1 * | 9/2008 | Shamaie | ....................... | 382/103 |
| 2008/0244465 A1 * | 10/2008 | Kongqiao et al. | .............. | 715/863 |
| 2009/0064054 A1 * | 3/2009 | Ishigaki et al. | ................ | 715/856 |
| 2009/0087028 A1 * | 4/2009 | Lacey et al. | ..................... | 382/103 |
| 2009/0110292 A1 * | 4/2009 | Fujimura et al. | .............. | 382/203 |
| 2009/0271004 A1 | 10/2009 | Zecchin et al. | | |
| 2009/0278915 A1 * | 11/2009 | Kramer et al. | ................... | 348/48 |
| 2009/0324008 A1 * | 12/2009 | Kongqiao et al. | ............. | 382/103 |
| 2010/0090946 A1 * | 4/2010 | Underkoffler et al. | ........ | 345/156 |
| 2010/0114517 A1 * | 5/2010 | Boeve et al. | ..................... | 702/92 |
| 2010/0117963 A1 * | 5/2010 | Westerman et al. | .......... | 345/163 |
| 2010/0329509 A1 * | 12/2010 | Fahn et al. | ..................... | 382/103 |

FOREIGN PATENT DOCUMENTS

| | | |
|---|---|---|
| KR | 2004004202 A | 5/2004 |
| WO | WO2009134482 | 11/2009 |

OTHER PUBLICATIONS

Smith et al., Efficient Hand Gesture Rendering and Decoding Using a Simple Gesture Library, State University of New York at Binghamton, entire document.
Dias et al., OGRE—Open Gestures Recognition Engine, ADETTi/ISCTE, Lisboa, Portugal, Issue Date : Oct. 17-20, 2004, pp. 33-40.
Zhe Yang et al., Accelerometer Based Hand Action Recognition, Entire document.

(Continued)

*Primary Examiner* — Amare Mengistu
*Assistant Examiner* — Antonio Xavier

(57) ABSTRACT

Hand pose recognition comprises determining an initial hand pose estimate for a captured input hand pose and performing iterations based upon hand pose estimates and residues between such estimates and hand pose estimates. One or more control signals are generated based upon the hand pose recognition.

18 Claims, 9 Drawing Sheets

(56) References Cited

OTHER PUBLICATIONS

Vassillis Athitsos, Database Indexing Methods for 3D Hand Pose Estimation, Entire document.
Pose Libraries, entire document, http://www.blender.org/development/releaselogs/blender-246/pose-libraries/.
P. Suryanarayan et al., Dynamic Hand Pose Recognition using Depth Data, 2010 International Conference on Pattern Recognition, Entire document.
W. T. Freeman et al., Television control by hand gestures, Mitsubishi Electric Research Laboratories, Tech. Rep. TR94-24, 1994, entire document.
R. Block, Toshiba Qosmio G55 features spursengine, visual gesture controls, http://www.engadget.com/2008/06/14/ toshiba-qosmio-g55-features-spursengine-visual-gesturecontrols/, Entire document.
S. Mitra at al., Gesture recognition: A survey, , IEEE Tran. Systems, Man, and Cybernetics, Part C: Applications and Reviews, vol. 37, No. 3, pp. 311-324, May 2007.
G. Yahav et al., 3d imaging camera for gaming application, Proc. of the Intl. Conf. on Consumer Electronics, ICCE 2007, Las Vegas, NV, Jan. 2007, pp. 1-2.
Project Natal, http://www.xbox.com/en-US/live/projectnatal/http://www.xbox.com/EN-in/kinect, Entire document.
J. A. Tropp et al., Signal recovery from random measurements via Orthogonal Matching Pursuit, IEEE Trans. Info. Theory, vol. 53, No. 12, pp. 4655-4666, Dec. 2007.
D. Needell et al., CoSaMP: Iterative signal recovery from incomplete and inaccurate samples, ACM Report Jan. 2008, Mar. 2008. Revised, Jul. 2008.
W. Dai et al., Subspace Pursuit for Compressive Sensing Signal Reconstruction, IEEE Trans. Info. Theory, vol. 55, No. 5, pp. 2230-2249, May 2009.
Chan Wah Ng et al., Gesture Recognition via Pose Classification, Department of Elctrical Engineering, National University of Singapore p. 3703, Publication Date :2000.

\* cited by examiner

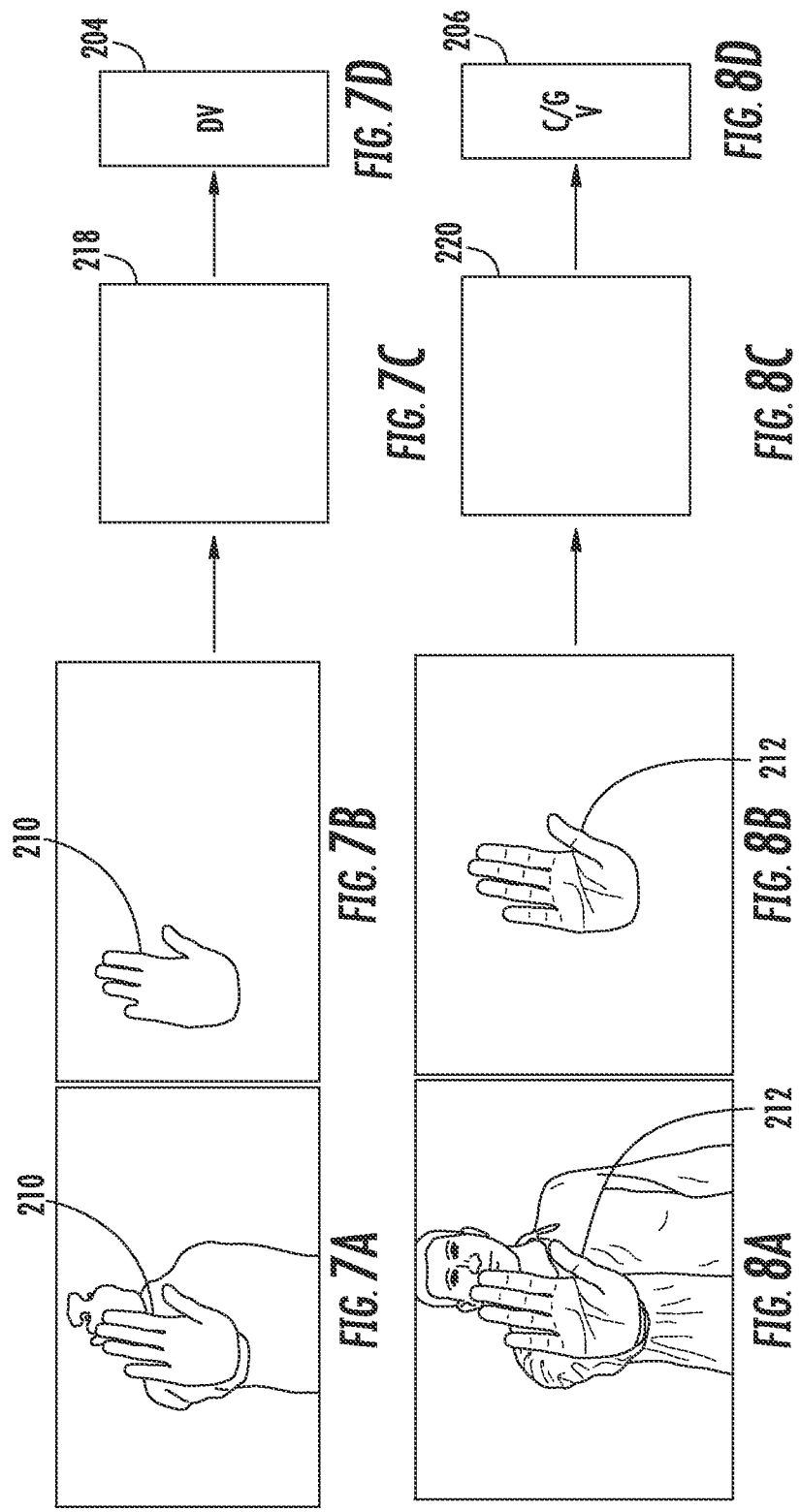

HAND POSE RECOGNITION

RELATED APPLICATIONS

Benefit is claimed under 35 U.S.C. 119(a)-(d) to Foreign application Serial No. 3420/CHE/2010 entitled "HAND POSE RECOGNITION", by Hewlett Packard Development Company L.P., filed on 15 Nov. 2010, in INDIA which is herein incorporated in its entirety by reference for all purposes.

BACKGROUND

Captured images of hand poses or gestures are sometimes used as input to a computerized device. Existing methods and systems using such captured images either utilize large libraries of samples which are difficult to create or update with new hand poses or suffer from inaccuracy.

BRIEF DESCRIPTION OF THE DRAWINGS

FIGS. 7A-7D are diagrams illustrating segmentation of a depth image frame and extraction of a depth feature vector according to an example embodiment.

FIGS. 8A-8D are diagrams illustrating segmentation of a color/grayscale feature image frame and extraction of a color/grayscale feature vector according to an example embodiment.

DETAILED DESCRIPTION OF THE EXAMPLE EMBODIMENTS

Figure 1:
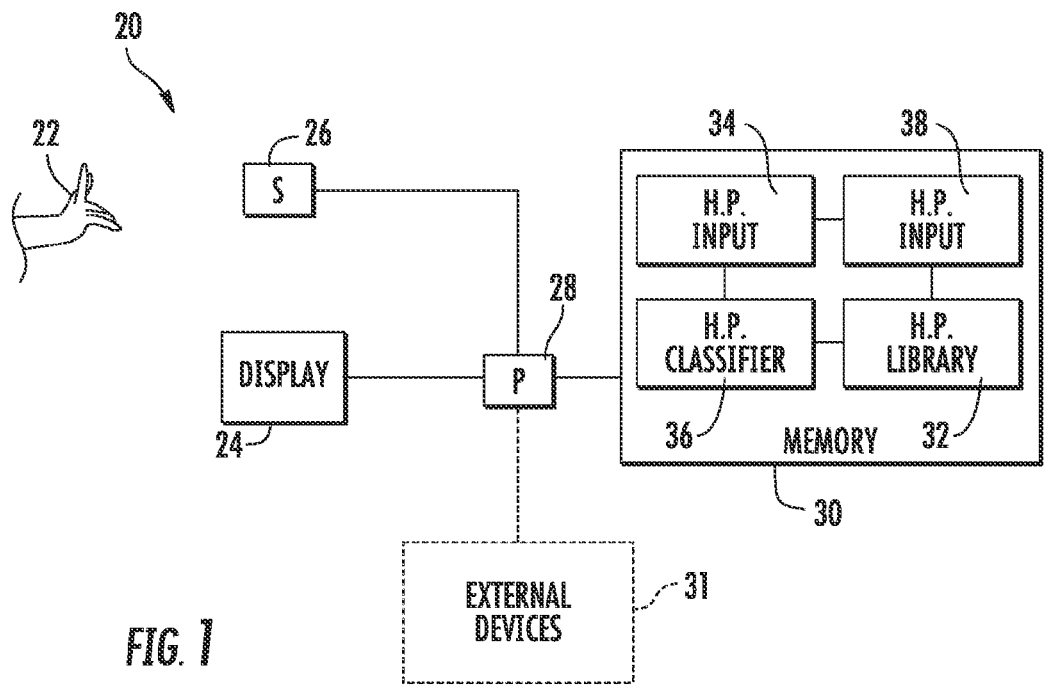
FIG. 1 is a schematic illustration of a hand pose recognition system according to an example embodiment.

FIG. 1 schematically illustrates a hand pose recognition system 20 according to an example embodiment. Hand pose recognition system 20 is configured to capture or sense image frames of a hand pose 22, to recognize the hand pose 22 and to carry out one or more commands in response to the recognized hand pose 22. As will be described hereafter, hand pose recognition system 20 performs such hand pose recognition using a relatively small library of possible hand poses while achieving enhanced accuracy. Hand pose recognition system 20 further facilitates easier addition of user-defined hand poses to the library.

Hand pose recognition system 20 comprises display 24, sensor 26, processor 28 and memory 30. Display 24 comprises a device in communication with processor 38 that is configured to present to a person visual information including one or more selections or prompts, wherein a person may use hand poses, such as the example hand pose 22 shown, to make a selection or respond to the prompt. Display 24 may have a variety of sizes, shapes and configurations. In one embodiment, display 24 may comprise a computer screen or monitor. In some embodiments, display 24 may be omitted.

Sensor 26 comprises one or more sensors or cameras configured to capture image frames of the presented or input hand pose 22 from a distance. In one embodiment, sensor 26 comprises a camera which provides both an RGB image of the hand pose and an inverse depth map (closest is brightest) for every image frame. The resolution of the depth image (320× 240) is eight bits and is generated in real-time at 30 frames per second. The RGB or color image is converted to a grayscale image. In other embodiments, the color image may be utilized. In yet other embodiments, other sensors or other cameras may be utilized.

Figure 2:
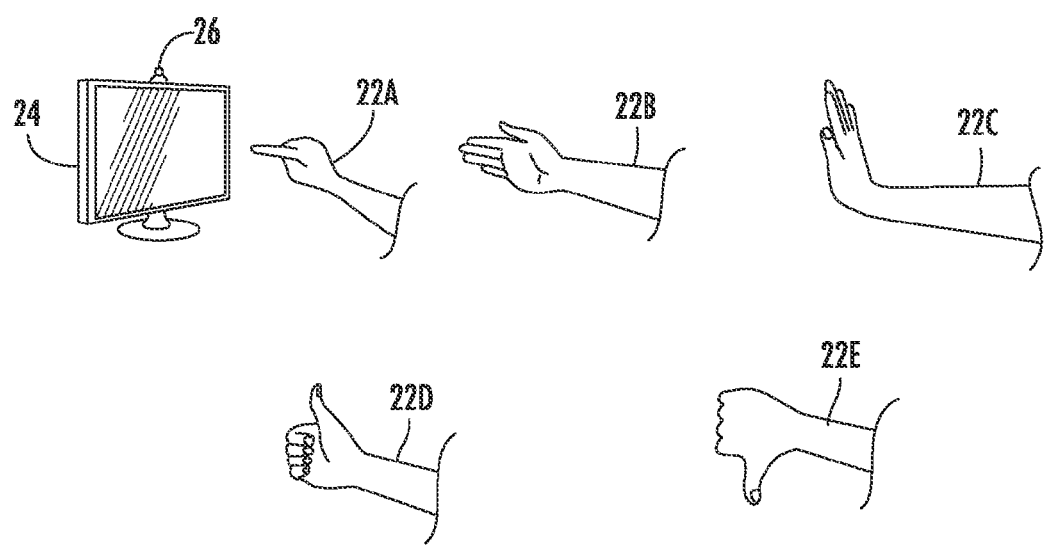
FIG. 2 different perspective you of an example display and sensor before various possible hand poses according to an example embodiment.

FIG. 2 illustrates one example arrangement of display 24 and sensor 26. In the example illustrated, the camera sensor 26 is placed atop the monitor of display 24. In other embodiments, sensor 26 may be placed anywhere near system 20 to facilitate interaction with the system.

FIG. 2 further illustrates several example hand poses which may be recognized by system 20. In particular, FIG. 2 illustrates a pointing gesture or pose 22A, a handshake pose 22B, an open palm pose 22C, a thumbs-up pose 22D and a thumbs down pose 22E. In other embodiments, system 20 may be configured to additionally or alternatively recognize any of the variety of other hand poses or gestures. In some embodiments, system 20 may be configured to permit persons to input or establish custom, personalized hand poses and to associate commands with the custom input hand poses.

As shown by FIG. 1, processor 28 comprises one or more processing units configured to generate signals following instructions contained in one or more memories 30. For purposes of this application, the term "processing unit" shall mean a presently developed or future developed processing unit that executes sequences of instructions contained in a memory, such as memory 30. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, processor 28 may be embodied as part of one or more application-specific integrated circuits (ASICs). Unless otherwise specifically noted, the controller is not limited to any specific combination of hardware circuitry and software, nor to any particular source for the instructions executed by the processing unit.

Processor 28, following instructions contained in memory 30, generates control signals directing the operation of display 24 and sensor 26. Processor 28 receives hand pose images from sensor 26 and recognizes the input hand pose following instructions contained in memory 30. In response to the identified input hand pose, processor 28, following response instructions contained in memory 30, generates one or more in signals to carry out one or more operations or functions. For example, in response to an identified hand pose, processor 28 may retrieve data from memory 30, from an external database or other source via a network or other data source and generate control signals causing the retrieved information or data to be displayed by display 24. In response to identified hand pose, processor 28 may generate control signals causing an electronic file to be altered and causing the altered file to be displayed on display 24 or to be stored in memory 30. In response to an identified hand pose, processor 28 may to perform one or more computations which result in an altered display 24 or altered file in memory 30. In yet other embodiments, in response to an identified hand pose, processor 28 may generate control signals for controlling devices 31 external to system 20, examples of which include, but are not limited to, printers or machines.

Memory 30 comprises one or more persistent storage devices storing instructions for processor 20 as well as storing other information or data for use by processor 28. Memory 30 may be directly connected to processor 28 in a wired or wireless fashion or may be in communication with processor 28 via a network. Memory 30 stores a hand pose library 32. Memory 32 further stores computer or processor readable language, code or instructions (schematically illustrated as hand pose input 34, hand pose classifier 36 and hand pose adder 38) to be carried out by processor 28 for performing hand pose recognition as well as adding custom hand poses. Hand library 32 comprises a database of various hand poses that are recognizable by system 21. Hand pose library 32 stores data, such as feature vectors, associated with each recognizable hand pose or hand pose class, wherein the hand pose classifier 36 compares an input hand pose 22 with possible hand poses (also referred to as hand pose classes) in the hand pose library 32 to identify and recognize the input hand pose 22.

Figure 3:
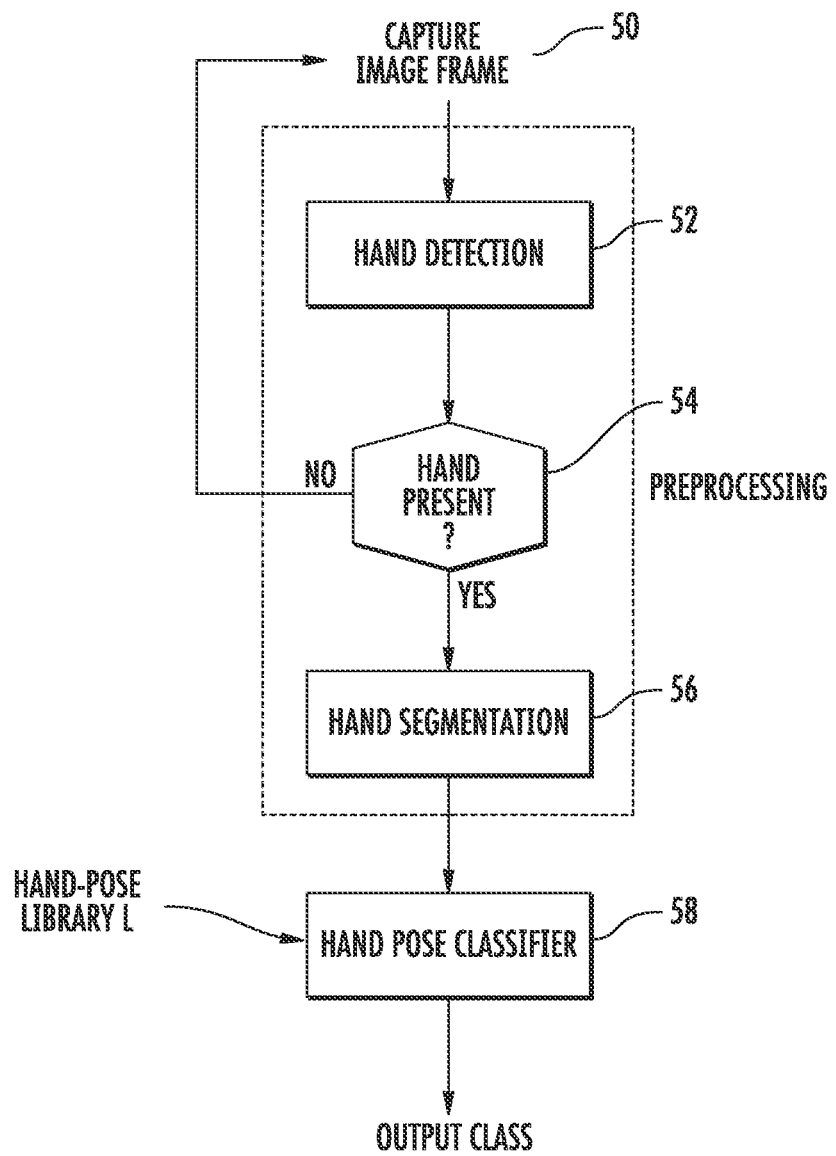
FIG. 3 is a flow diagram of a hand pose recognition system according to an example embodiment.

Hand pose input 34 comprises computer readable language or code stored memory 30 for controlling the detection and segmentation of an input hand pose 22 by processor 28. FIG. 3 is a flow diagram illustrating the hand pose capturing and preprocessing carried out by processor 28 under the control of hand processor input 34. As shown by step 50, processor 28 receives a captured image frame of an input hand pose 22 by sensor 26. As indicated by steps 52 and 54, processor 28 determines the presence or absence of a hand from the captured image frame received from sensor 26. In one embodiment, the hand detection may be based upon a depth histogram and appropriate thresholding. In other embodiments, other methods or techniques may be used for hand detection. As indicated by step 54, if no hand is detected, processor 20 moves onto a next image frame captured by sensor 26. Alternatively, if a hand is detected, processor 28 proceeds to hand segmentation as indicated by step 56.

In hand segmentation step 56, processor 28 segments or separates that portion of the captured image frame corresponding to the hand from other elements or background. In the example described in which sensor 26 includes both depth and color/grayscale values, both depth and grayscale values are used to separate or distinguish the hand from surrounding objects. In other embodiments, such segmentation may be performed in other manners. As indicated by step 58, once hand segmentation has been completed by processor 28, processor 20 proceeds with classification or recognition of the input hand pose 22 under the direction of hand pose classifier 36

Figure 4:
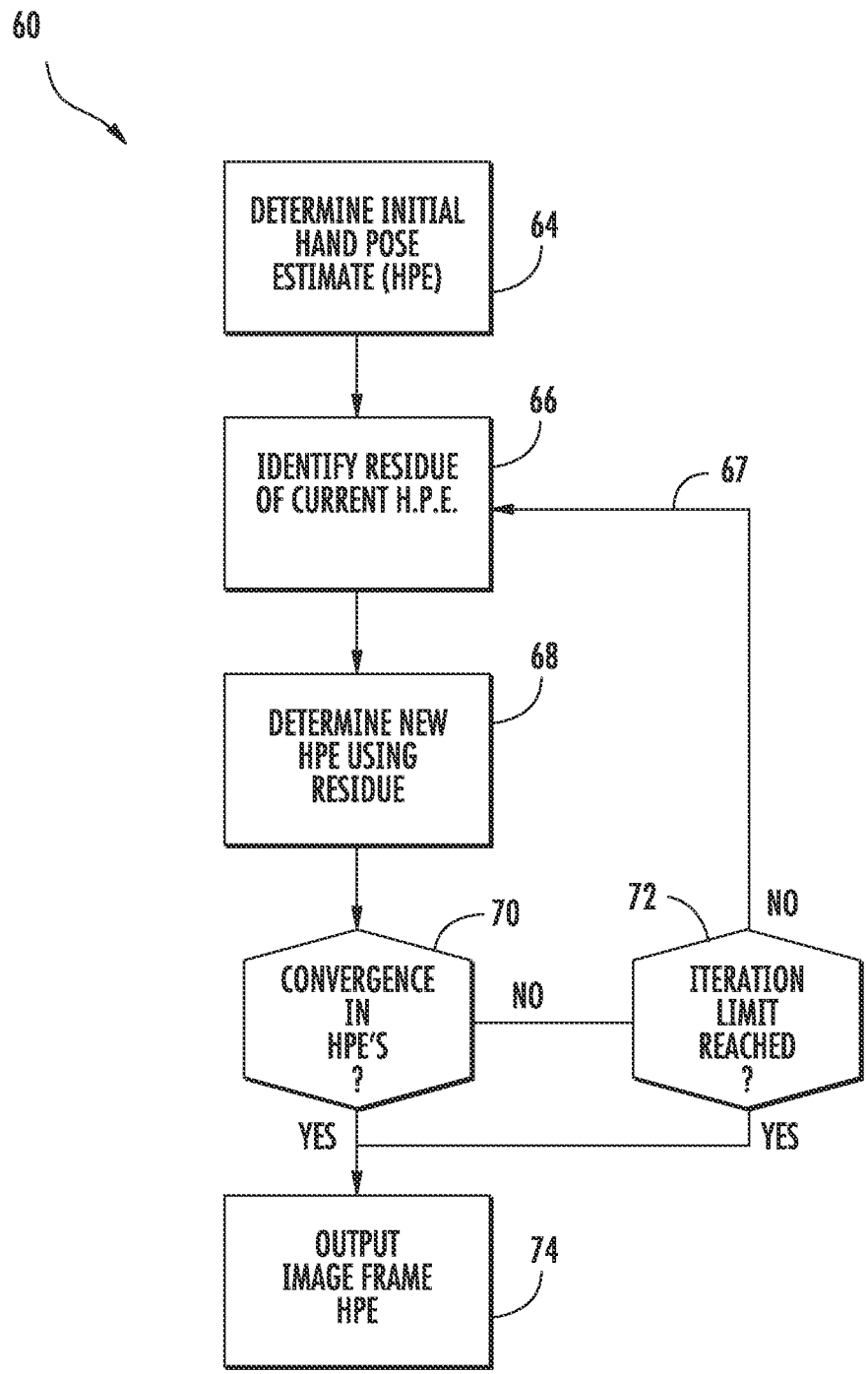
FIG. 4 is a flow diagram of a hand pose classification method according to an example embodiment.

Hand pose classifier 36 comprises computer readable language or code stored in memory 30 and configured to direct processor 28 in the recognition or identification of an input hand pose 22. FIG. 4 is a flow diagram of a method 60 carried out by processor 28 for estimating or identifying the input hand pose 22 captured in the particular image frame by sensor 26. As indicated by step 64, processor 28 determines an initial hand pose estimate. The initial hand pose estimate may be determined in one of multiple fashions using the captured and segmented image frame of the input hand pose 22 and the possible hand poses or hand pose classes contained in hand pose memory 32.

As indicated by arrows 67, processor 68 carries out multiple operations and a plurality of iterations based upon current hand pose estimates and a computed residue between the hand pose estimate and the input hand pose. During the first iteration, the initial hand pose estimate serves as the current hand pose estimate. Thereafter, the hand pose estimate computed from the previous hand pose estimate and the residue of the previous hand pose serve as the current hand pose estimate. As indicated by step 66, once processor 28 determines the initial hand pose estimate, processor 28, under the direction of hand pose classifier 36, identifies a residue for the current hand pose estimate. For purposes of this disclosure, the term "residue" refers to quantified differences between the sensed values of the actual input hand pose and stored corresponding values in the hand pose library for the possible hand pose or hand pose class constituting the current hand pose estimate.

As indicated by step 68, processor 28 uses the residue for the current hand pose estimate to determine a new hand pose estimate. As indicated by step 70, processor 68 determines whether there is a convergence between the new hand pose estimate and the previous hand pose estimate. In some embodiments, processor 28 may determine whether a convergence occurs amongst more than two hand pose estimates. If an insufficient convergence is found, processor 28 goes on to compute another iteration, wherein processor 28 identifies the residue of the most recent hand pose estimate with respect to the input hand pose and determines yet another new hand pose estimate using the most recently determined residue. The iterations are continued until processor 28 finds a sufficient convergence amongst the hand pose estimates or until the number of iterations reach a predefined limit or cap as indicated by step 72.

As indicated by step 74, once processor 28 determines that the hand pose estimates or hand pose class estimates from the iterations sufficiently converge towards a single possible hand pose found in library 32 or once the number of iterations has reached a predefined limit, processor 28 outputs the image frame hand pose estimate. The output image frame hand pose estimate scores may then be compared to additional thresholds to determine (1) whether the input hand pose 22 is satisfactorily proximate to the output image frame hand pose estimate such that the image frame hand pose estimate may serve as a reliable prediction or estimate for the input hand pose depicted in the captured image frame or (2) whether the input hand pose 22 captured in the image frame is an outlier, not sufficiently corresponding to one of the predefined possible hand poses is contained in hand pose library 32.

FIGS. 5-10 illustrate recognition or classification method 160, a particular example embodiment of the classification or recognition method 60 shown in FIG. 4. An example psuedocode for method 160 is as follows:

---

Hand-pose Classification

Input:

L: Library of known hand-pose classes
N: Number of hand-poses, labeled 1, 2, . . . , N
l: Feature vector describing test pose
$T_1, T_2$: Truncation Parameters
$\tau_1, \tau_2$: Thresholds
T: Number of iterations -continued Hand-pose Classification Initialize:

$I^0$: set of $T_1$ column indices of L chosen based on f(L, l)
$I_i^0$: set of indices in $I^0$ corresponding to pose i, i = 1, 2, ..., N.
Initial hand-pose estimate $C^0$ = arg max$_i$ $\|L_{I_i^0} x_i\|_2$, where $x_i = L_{I_i^0}^\dagger l$
Initialize residue $r^0 = l - L_{I_{C^0}^0} x_{C^0}$
Iterate:

for t = 1 to T
Compute $I_{res}^{t-1}$: set of $T_2$ column indices of L chosen based on f(L, $r^{t-1}$)
Merge $I_{new}^t = I_{C^{t-1}}^{t-1} \cup I_{res}^{t-1}$
Compute $I^t$: set of $T_1$ column indices of L chosen based on $L_{I_{new}^t}^\dagger l$
Compute $I_i^t$: set of indices in $I^t$ corresponding to Pose i
Compute pose scores $s^t(i) = \|L_{I_i^t} x_i\|_2$, where $x_i = L_{I_i^t}^\dagger l$
Hand-pose estimate $C^t$ = arg max$_i$ $\|L_{I_i^t} x_i\|_2$
Compute residue $r^t = l - L_{I_{C^t}^t} x_{C^t}$
Check stopping criteria
end for
Stopping criteria:

If $\left\{ C^t = C^{t-1} \text{ AND } \|r^t\|_2 \leq \|r^{t-1}\|_2 \text{ AND } \right.$ $\left. \dfrac{\sum_{i=1}^{N} |s^t(i) - s^{t-1}(i)|}{\sum_{i=1}^{N} |s^{t-1}(i)|} < \tau_1 \right\}$ OR t = T, then check pose rejection criterion
else go to iteration step 1
Pose rejection criterion:

If $g(s^t, I^t, L, l) < \tau_2$, where $s^t = (s^t(1), s^t(2), \ldots s^t(N))$
then reject test pose
else output pose $C^t$ and stop Pseudocode Description 1. One possible implementation of f (L,l) is to compute the vector dot-products between each column of L and l (or $r^{t-1}$ as the case may be), and then select those column indices corresponding to the highest correlations. The selected columns stacked together are now denoted as $L_I$, where I is used here to denote the appropriate set of indices referred to. Further $L_I^\dagger$ denotes the pseudoinverse of $L_I$.
2. Truncation parameters $T_1$ and $T_2$ are chosen appropriately depending on the application and Library L
3. One possible method of selecting $I^t$ is to choose the indices corresponding to the largest amplitudes.
4. Next, among the identified feature vectors in $I^t$, only those that belong to a particular hand pose are considered, and a score is computed for each hand pose class. The hand pose class with the highest score is declared as the current hand pose estimate.
5. If there is no convergence behavior among the hand pose estimates at successive iterations, and if t<T, then the iterations are continued. Note that only one possible convergence requirement is outlined in the stopping criteria given in the pseudocode, and any other suitable criteria are equally applicable.
6. When t=T iterations or there is convergence, the test hand pose is checked if it should be rejected. This is done using the pose rejection criterion. If the hand pose is not to be rejected, then the current hand pose estimate is declared as the output. One possible implementation of the rejection criterion g(.) is a simple threshold based rejection. Other suitable rejection criteria are equally applicable. For example, one could carry out further iterations with different truncation parameters.

Note that the proposed algorithm can be easily adapted to cover cases where there are multiple (say p) observations of the hand pose (say, using multiple cameras); or multiple samples of a given test pose (for example, multiple image frames).

Figure 5:
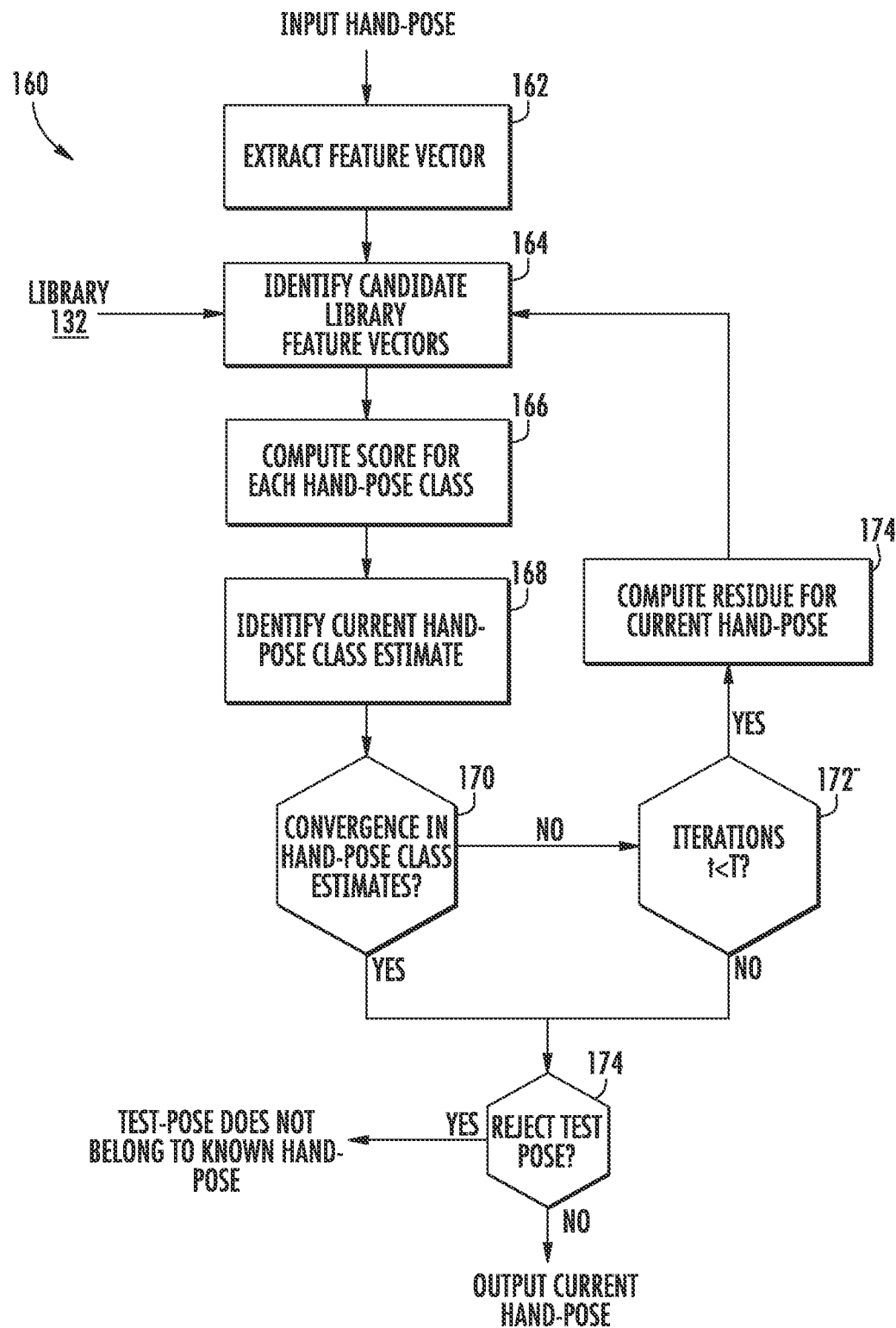
FIG. 5 is a flow diagram of a particular embodiment of the hand pose classification method of FIG. 4 according to an example embodiment.
Figures 6A, 6B:
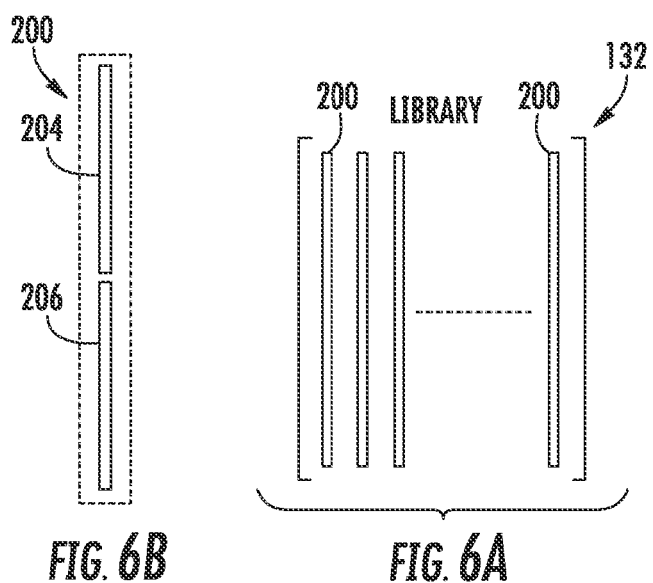
FIG. 6A is a schematic illustration of a library of hand pose feature vectors used in the method of FIG. 5 used in the method of FIG. 5 according to an example embodiment.
FIG. 6B is a schematic illustration of a single feature vector of the library of FIG. 6A.

As shown by FIG. 5, method 160 utilizes a library 132 of possible hand poses. Similar to library 32, library 132 is stored in a memory 30 and utilized by processor 28 for performing hand pose recognition. As shown by FIG. 6A, library 132 comprises a series of stacked feature vectors 200 derived from captured image frames of the hand poses contained in library 132. Each feature vector 200 represents a particular sample of one of the possible hand poses or hand pose classes recognized by system 20. Each possible hand pose or hand pose class may have multiple associated feature vectors 200, wherein each feature vector 200 for a same possible hand pose may constitute a variation on the particular hand pose. For example, one feature vector 200 for hand pose 22D (shown in FIG. 2) may be derived from a captured image of the person's thumb extending forward to a first extent, whereas another feature vector 200 for the same hand pose 22D may be based upon a captured image of the person's thumb extending forward to a second different extent. Another feature vector 200 for the same hand pose 22D may be based upon a captured image of the hand pose 22D taken from a slightly different perspective or angle.

FIG. 6B schematically illustrates a single feature vector 200 in detail. Feature vector 200 comprises a concatenation of two smaller feature vectors. In the example illustrated, each feature vector 200 comprises a depth feature vector 204 having a length of 100 and a color or grayscale feature vector 206 having a length of 100 obtained from the same captured image frame. In other embodiments, each feature vector 200 may have other sizes or features.

FIGS. 7 and 8 illustrate the creation of an individual feature vector 200 for library 132. As shown by FIGS. 7A and 8A, sensor 26 outputs an inverse depth map 210 (closest brightest) and an RGB image 212 of the hand pose for the image frame. The RGB or color image 212 is converted to grayscale image. FIGS. 7B and 8B illustrate the inverse depth image 210 and the color/grayscale image 212, respectively, after segmentation by processor 28. As shown by FIGS. 7C and 8C, processor 28 normalizes the segmented images to matrices 218, 220 of a predetermined size. In example illustrated, the segmented images 210 and 212 are normalized to matrices each having a size of 100×100 pixels. Finally, as shown by FIGS. 7D and 8D, processor 28 down samples and rasterizes each of the normalized pixel matrices 218, 220 to form depth feature vector 204 and color/grayscale feature vector 206. The depth feature vector 204 and the color/grayscale feature vector 206 of the image frame are then concatenated by processor 28 as shown in 6B and then stacked to form library 132 as shown in FIG. 6A.

According to one embodiment, multiple samples of each possible hand pose are captured by sensor 26 and transformed to feature vectors 200 of library 132. The number of samples for each pose or pose class in library 132 is reduced using techniques such as clustering, singular value decomposition (SVD) and the like. For example, in one embodiment, processor 26 may use K-means clustering, wherein each cluster can be stated as a variation of a pose. Processor 28 may then select a representative sample from each cluster for each pose to reduce the size of library 132. In another embodiment, library 132 may be formed by using feature vectors from other sources.

Figure 9:
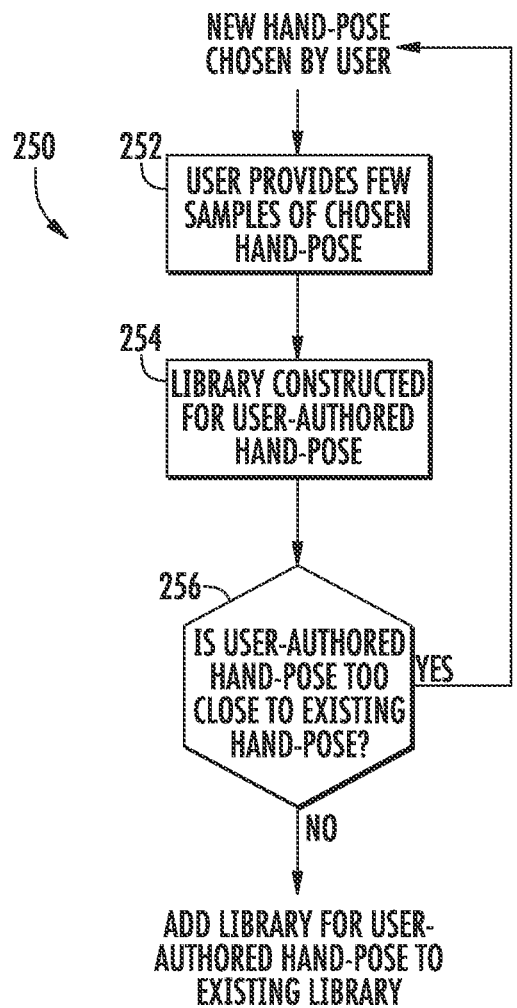
FIG. 9 is a flow diagram of a method for adding custom hand poses to the library of FIG. 6A.

In a fashion similar to the creation of library 132, system 20 permits a user to add customized or personalized hand poses and associate commands with such hand poses. FIG. 9 is a flow diagram of a method 250 for adding customized individual hand poses to library 132. As indicated by step 252, once a person chooses his or her hand pose which is not contained in library 132, the person may provide samples of the chosen hand pose. This may be done by the person indicating to processor 28 through an input device, such as a keyboard, mouse or the like, that he or she wishes to create a new hand pose. Thereafter, the user may be attracted to provide samples of the chosen hand pose by posing as her hand before sensor 26 which captures image frames of the custom hand pose. As indicated by step 254, each image frame of the user authored hand pose is converted or transformed to a feature vector 200 as discussed above with respect to FIGS. 7-8. As indicated by step 256, before adding the one or more feature vectors for the new custom hand pose to library 132, processor 28 may determine whether the user authored hand pose is too close to existing hand poses in library 132. In one embodiment, this may be achieved by calculating a residue between the new custom hand pose and each of the existing hand poses and comparing the residue against a predetermined threshold. In other embodiments, other techniques may be used for determining whether a user authored hand pose is sufficiently distinct for addition to library 132.

As shown by step 162 of FIG. 5, once processor 20 receives a segmented image frame of a hand pose (following step 56 in FIG. 3), processor 28 extracts feature vectors from the image frame. The extraction of a feature vector from the captured image frame of the input hand pose is performed using the same method that is used to create each feature vector 200 of library 132. In particular, as described above with respect to FIGS. 7 and 8, depth and color/grayscale image frames are captured and segmented. The segmented image frames are then normalized and finally down sampled and rasterized. The depth feature vector and the color/grayscale feature vector for each image frame are then concatenated to form an input hand pose feature vector.

Figure 10A:
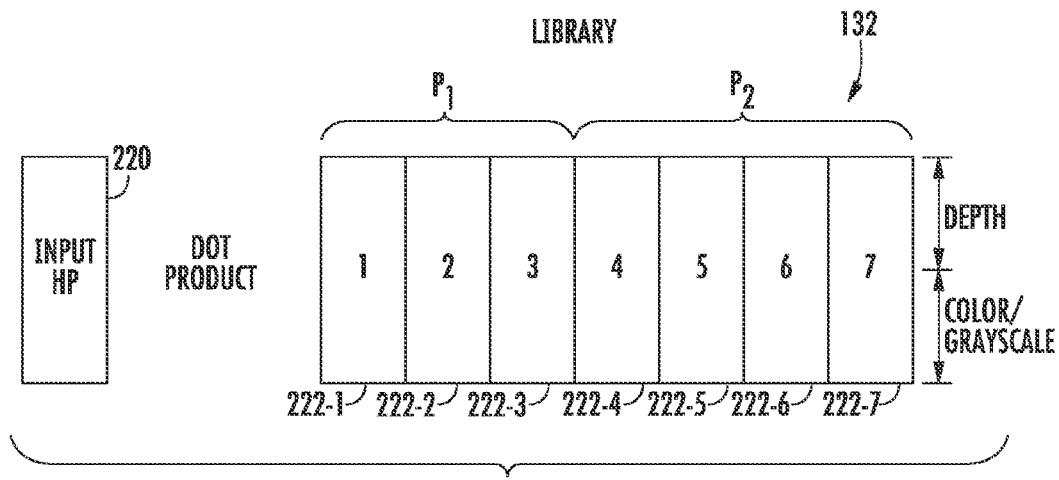
FIGS. 10A-10F are diagrams of feature vectors illustrating identification of an image frame hand pose estimate according to an example of ottoman.
Figure 10B:
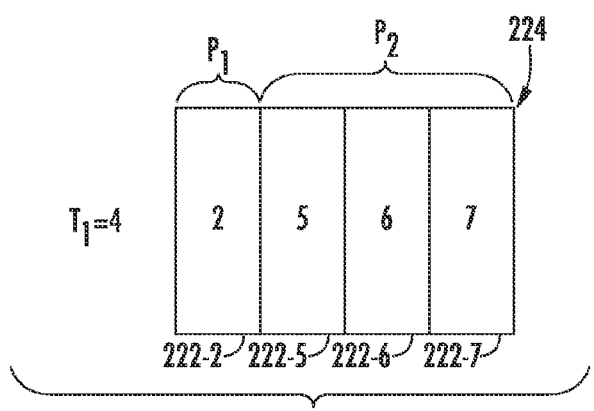
Figure 10C:
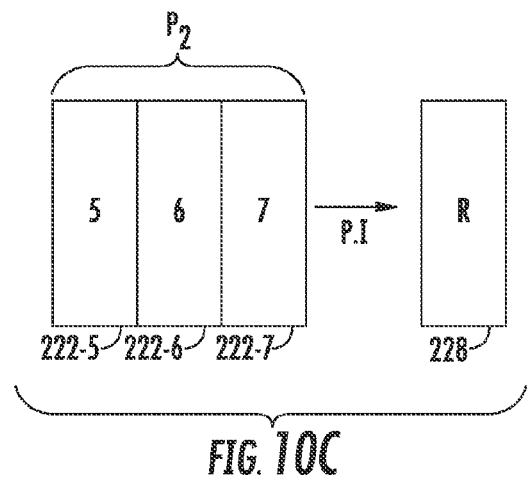

As indicated by step 164, processor 28 identifies candidate feature vectors from library 132. FIGS. 10A-10F illustrate one example wherein library 132 contains two possible poses or classes, P1 and P2, wherein pose P1 has three samples or feature vectors 222-1 to 222-3 and wherein pose P2 has four samples or feature vectors to 222-4 to 222-7. FIGS. 10A and 10B illustrate one method by which processor 28 may identify initial candidate feature vectors. As shown by FIG. 10A, processor 28 computes a dot product of the input hand pose vector 220 and all of the feature vectors 222-1-222-7 of library 132. As shown by FIG. 10B, the feature vectors having the highest dot product results are chosen as the initial candidate feature vectors 224 from library 132. In the example illustrated, a truncation value T1 of 4 is applied such that the candidate feature vectors 224 comprise the top four feature vectors from library 132. In the example illustrated, the candidate feature vectors 224 include feature vectors 222-2, 222-5, 222-6 and 222-7.

As indicated by step 166, processor 28 computes a score for each hand pose having feature vectors amongst the candidate feature vectors 224. The hand pose P1, P2 having the highest score is identified as the initial hand pose estimate. In the example illustrated, the initial hand pose estimate is pose P2 including feature vectors 222-5, 222-6 and 222-7. According to one embodiment, processor 28 (shown in FIG. 1) scores the hand poses by computing a pseudoinverse (also known as the Moore-Penrose Pseudoinverse) of the candidate feature vectors 224 multiplied by the input hand pose feature vector 220. In other embodiments, processor 28 may score the possible hand poses using the candidate feature vectors 224 in other fashions. This process of identifying the initial hand pose estimate is described under the "Initialize" subheading of the pseudo code above. The initial hand pose class estimates serves as the "current hand pose class estimate" in step 168 of FIG. 5 during the first iteration.

As indicated by steps 170 and 172 in FIG. 5, processor 28 settles on an image frame hand pose estimate for the particular captured image frame if processor 28 determines that the current hand pose class estimates have sufficiently converged towards a single possible hand pose (step 170), and if not, whether the number of iterations performed has reached an iteration limit T (step 172). Since after the first iteration there is only one current hand pose estimate and only one iteration has been completed, processor 28 proceeds to step 174 in which processor 20 computes a residue for the current hand pose estimate. According to one embodiment, the residue from the current hand pose estimate is computed by processor 28 applying a pseudoinverse to the candidate vectors belonging to the current hand estimate. In the example shown in FIG. 10C, the pseudoinverse is applied on the matrix formed by concatenating the feature vectors 222-5, 222-6 and 222-7 in the given example. This results in a residue vector 228.

Figure 10D:
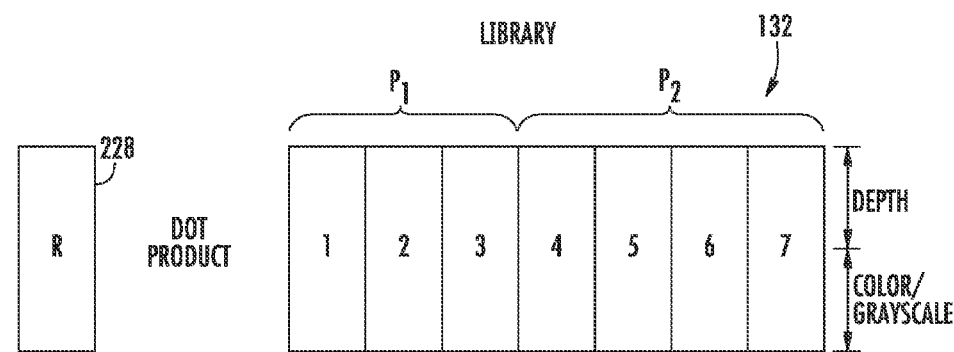
Figure 10E:
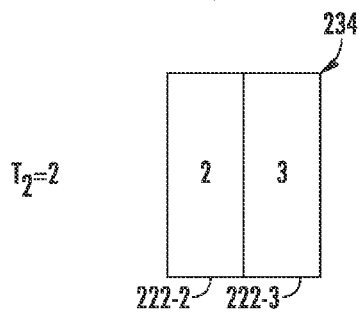

As indicated by step 164, after computing the residue vector, processor 28 once again identifies candidate library feature vectors for the next hand pose estimate. However, unlike the candidate library feature vectors utilized to determine the initial hand pose estimate prior to the completion of any iterations, the candidate library feature vectors after the first iteration are determined in part using the residue vector from the previous hand pose estimate. In particular, processor 28 computes a dot product on the residue vector from the previous hand pose estimate and each feature vector of library 132. An example of this step is shown in FIG. 10D in which processor 28 applies a dot product of the residue vector 228 and each of the feature vectors of library 132, 221-227. As shown by FIG. 10E, the feature vectors having the highest dot product results are chosen as the residue-based feature vectors 234 from library 132. In the example illustrated, a truncation value T2 of 2 is applied such that the residue-based feature vectors 234 comprise the top two feature vectors from library 132. In the example illustrated, the residue based feature vectors 234 include feature vectors 222-2 and 222-3.

Figure 10F:
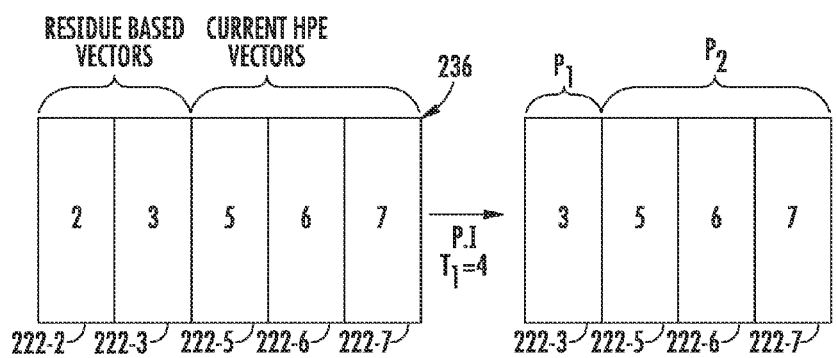

As shown by FIG. 10F, processor 28 adds the residue-based feature vectors 234 to the previous candidate feature vectors from the previous hand pose estimate and applies a pseudoinverse to the resulting set 236 of feature vectors, which is then multiplied by the input feature vector. Those feature vectors having the highest scores after application of the pseudoinverse and multiplication, are identified as the new candidate library feature vectors (or "best match feature vectors"). In the example illustrated in which the truncation value T1=4, the top four feature vectors are identified as the candidate library feature vectors. Thereafter, processor 28 scores possible hand poses using the current candidate library feature vectors to identify a new hand pose class estimate. In the example illustrated, the new hand pose class estimate is once again determined by applying a pseudoinverse to the candidate library feature vectors to score possible hand poses or classes. In the example illustrated in FIG. 10F, processor 28 would apply a pseudoinverse to the candidate library feature vectors 222-3, 222-5, 222-6 and 222-7 to score possible hand poses P1 and P2. This process of computing a residue for a current hand pose estimate and identifying a new hand pose estimate using the residue is described above in the section entitled "Iterate" in the above pseudocode.

Referring back to method 160 in FIG. 5, once the second hand pose class estimate has been identified, processor 28 determines whether there is sufficient convergence amongst the hand pose class estimates of the iterations per step 170 to settle upon image frame class estimate. As described above in the "Stopping Criteria" section of the pseudocode, the predetermined convergence occurs when the new current hand pose class estimate is the same as the previous current hand pose estimate, the residue associated with the new hand pose estimate is less than the residue associated with the previous hand pose estimate and a normalized sum of absolute differences between new current hand pose class estimates and previous current hand pose class estimates for the iterations is less than a predetermined threshold. In other embodiments, other criteria may be used by processor 28 to determine when to settle upon an image frame class pose estimate based on the current hand pose class estimates of the iterations.

If processor 28 determines there not been sufficient convergence of the iteration hand pose estimate according to the stopping criteria, processor 28 then determines whether the iteration limit has been met per step 172. If the limitation is not been met, processor 28 continues on with yet another iteration as described above. If the iteration limit T has been reached, processor 28 proceeds to settle upon and output the image frame hand pose estimate.

As indicated by step 174 in FIG. 5, processor 28 applies a test to determine whether the input hand pose feature vector is sufficiently close to the feature vectors of the image frame hand pose estimate. If the input hand pose is not sufficiently close to the output image frame hand pose estimate, the input hand pose is rejected as being an outlier and not belonging to any of the possible hand poses of library 132. If the input hand pose of the image frame is sufficiently close to the image frame hand pose estimate, the image frame hand pose estimate is used to determine a final hand pose estimate based upon other image frame hand pose estimates of other image frames of the hand pose. For example, in one embodiment, image frame hand pose estimates are identified by processor 28 for multiple image frames of the hand pose. Processor 28 uses the multiple output image frame hand pose estimates to determine a final hand pose estimate that is used by processor 28 to generate control signals. In one embodiment, the final hand pose is identified as the possible hand pose that has a majority of the output image frame hand pose estimates.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A hand pose recognition method comprising:
    capturing, with one or more sensors, an image frame of an input hand pose;
    determining an initial hand pose estimate for the input hand pose;
    performing iterations, each iteration comprising:
        identifying a residue for a current hand pose estimate based upon data values for the input hand pose and data values for the current hand pose estimate, wherein the initial hand pose estimate serves as the current hand pose estimate during a first one of the iterations; and
        determining a current hand pose estimate based upon the input hand pose and the residue from the previous current hand pose estimate, comprising identifying residue based feature vectors that best match the residue from a general library of feature vectors and adding the identified residue based feature vectors to candidate feature vectors of the current hand pose estimate to form iteration feature vectors;
    outputting a hand pose estimate for the image frame of the input hand pose based upon results from the iterations; and
    generating one or more control signals, based upon the first image frame hand pose estimate, wherein the input hand pose is transformed to one or more control signals.

2. The method of claim 1, wherein determining an initial hand pose estimate for the input hand pose comprises:
    extracting an input hand pose feature vector from the image frame of the input hand pose;
    identifying the candidate feature vectors that best match the input hand pose feature vector from the general library of feature vectors for possible hand poses;
    computing a score for each possible hand pose based upon the candidate feature vectors, wherein the possible hand pose having the highest score is the initial hand pose estimate.

3. The method of claim 2, wherein identifying candidate feature vectors that best match the input hand pose feature vector from a general library of feature vectors for possible hand poses comprises using a dot product of the input hand pose feature vector and feature vectors of the general library of feature vectors for possible hand poses.

4. The method of claim 2, wherein the score for each possible hand pose is computed using a pseudoinverse of the input hand pose feature vector and the candidate feature vectors for each possible hand pose.

5. The method of claim 2, wherein determining a new current hand pose estimate based upon the input hand pose and the residue from the previous current hand pose estimate further comprises:
    identifying best match feature vectors, the best match feature vectors being those iteration feature vectors that best matches the input feature vector;
    computing a score for each possible hand pose based upon the best match feature vectors, wherein the possible hand pose having the highest score is the new current hand pose estimate.

6. The method of claim 5 wherein the score for each possible hand pose is computed using a pseudoinverse of the best match feature vectors for each possible hand pose and the input hand pose feature vector.

7. The method of claim 5, wherein identifying the best match feature vector comprises:
computing a pseudoinverse of the iteration feature vectors;
multiplying the pseudoinverse of the iteration feature vectors and the input hand pose feature vector, wherein the best match feature vectors are those iteration feature vectors having the highest scores after their pseudoinverse result is multiplied by the input hand pose feature vector.

8. The method of claim 1, wherein the initial hand pose estimate has one or more hand pose feature vectors, the method further comprising extracting an input hand pose feature vector from the image frame of the input hand pose.

9. The method of claim 1, wherein the image frame hand pose estimate is output in response to a predetermined convergence of the current hand pose estimates from different iterations.

10. The method of claim 9, wherein the predetermined convergence comprises the new current hand pose class estimate being same as the previous current hand pose estimate, the residue associated with the new hand pose estimate being less than the residue associated with the previous hand pose estimate and a sum of differences between new current hand pose class estimates and previous current hand pose class estimates for the iterations being less than a predetermined threshold.

11. The method of claim 1 further comprising:
generating a plurality of image frame hand pose estimates including the first image frame hand pose class estimate;
determining a final hand pose estimate based upon the plurality of image frame hand pose estimates, wherein the control signals are generated with the processor based upon the final hand pose estimate.

12. The method of claim 11 further comprising rejecting a portion of the plurality of image frame hand pose estimates, wherein determining the final hand pose the estimate is based upon the plurality of image frame hand pose estimates excluding the rejected portion of the plurality of image frame hand pose estimates.

13. The method of claim 1, wherein the initial hand pose estimate is derived from a hand pose library of possible hand poses, the hand pose library comprising a matrix of one or more hand pose feature vectors for each possible hand pose.

14. The method of claim 13 further comprising adding a new possible hand pose to the hand pose library by appending one or more new hand pose feature vectors for the new possible hand pose to the matrix.

15. The method of claim 14 further comprising:
capturing, with one or more sensors, an image frame of the new possible hand pose;
extracting a new possible hand pose feature vector from the image frame of the new possible hand pose; and
determining whether the new possible hand pose feature vectors are too close to existing hand pose feature vectors of the library.

16. The method of claim 1, wherein capturing the first image frame of the input hand pose comprises:
capturing a color/grayscale image frame having color/grayscale features of the input hand pose;
capturing a depth image frame having depth features of the input hand pose, wherein the depth image frame is captured concurrently with the captured color/grayscale frame; and
forming a single input hand pose feature vector based upon the captured depth image frame and the captured color/grayscale image frame.

17. A hand pose recognition method comprising:
generating a plurality of image frame hand pose estimates for an input hand pose, each image frame hand pose estimate being generated by:
capturing, with one or more sensors, an image frame of the input hand pose;
determining an initial hand pose estimate for the input hand pose by:
extracting an input hand pose feature vector from the image frame of the input hand pose;
identifying candidate feature vectors that best match the input hand pose feature vector from a general library of hand pose feature vectors for possible hand poses;
computing a score for each possible hand pose based upon the candidate feature vectors, wherein the possible hand pose having the highest score is the initial hand pose estimate;
performing iterations, each iteration comprising:
identifying a residue for a current hand pose estimate based upon data values for the input hand pose and data values for the current hand pose estimate, wherein the initial hand pose estimate serves as the current hand pose estimate during a first one of the iterations; and
determining a new current hand pose estimate based upon the input hand pose and the residue from the previous current hand pose estimate by:
determining a new current hand pose estimate based upon the input hand pose and the residue from the previous current hand pose estimate comprises:
identifying residue based feature vectors that best match the residue from the general library of feature vectors;
adding the identified residue based feature vectors to the candidate feature vectors of the current hand pose estimate to form iteration feature vectors;
identifying best match feature vectors, the best match feature vectors being those iteration feature vectors that best matches the input feature vector; and
computing a score for each possible hand pose based upon the best match feature vectors, wherein the possible hand pose having the highest score is the new current hand pose estimate;
storing the image frame hand pose estimate for the image frame of the input hand pose in response to a predetermined convergence of the current hand pose estimates from different iterations;
determining a final hand pose estimate based upon the plurality of image frame hand pose estimates; and
generating one more control signals, with a processor, based upon the final hand pose estimate, wherein the input hand pose this transformed to the one or more control signals.

18. A hand pose recognition system comprising:
one or more sensors configured to capture an image frame of an input hand pose;
a memory containing a library of possible hand poses;
one or more processors in communication with any of the one or more sensors and the memory, the one or more processors configured to:
determine an initial hand pose estimate for the input hand pose;

perform iterations, each iteration comprising:
   identifying a residue for a current hand pose estimate based upon data values for the input hand pose and data values for the current hand pose estimate, wherein the initial hand pose estimate serves as the current hand pose estimate during a first one of the iterations; and
   determining a new hand pose estimate based upon the input hand pose and the residue from the previous current hand pose estimate;
output a hand pose estimate for the image frame of the input hand pose based upon results from the iterations; and
generate one more control signals based upon the hand pose estimate,
wherein the image frame hand pose estimate is output in response to a predetermined convergence of the current hand pose estimates from different iterations, the predetermined convergence comprises the new current hand pose class estimate being same as the previous current hand pose estimate, the residue associated with the new hand pose estimate being less than the residue associated with the previous hand pose estimate and a sum of differences between new current hand pose class estimates and previous current hand pose class estimates for the iterations being less than a predetermined threshold.

* * * * *